Feb. 9, 1943.  W. F. ARNDT  2,310,339
DRIVE SYSTEM FOR PROCESS PHOTOGRAPHY
Filed July 26, 1940
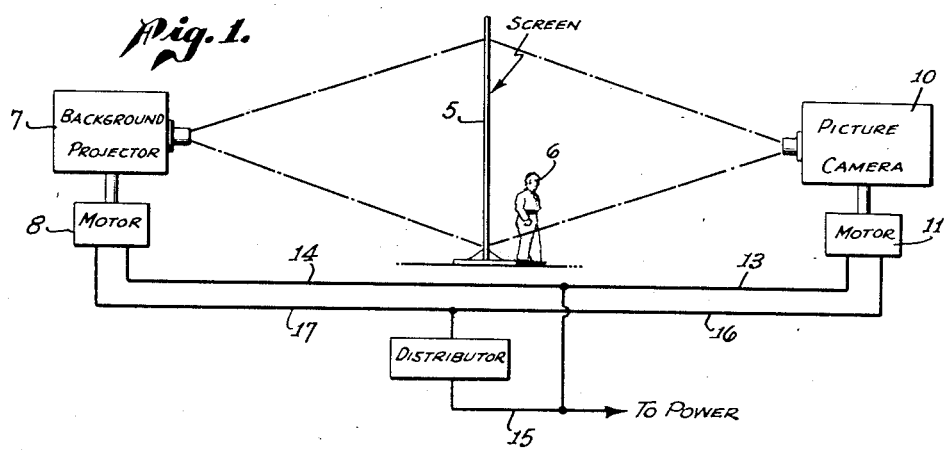
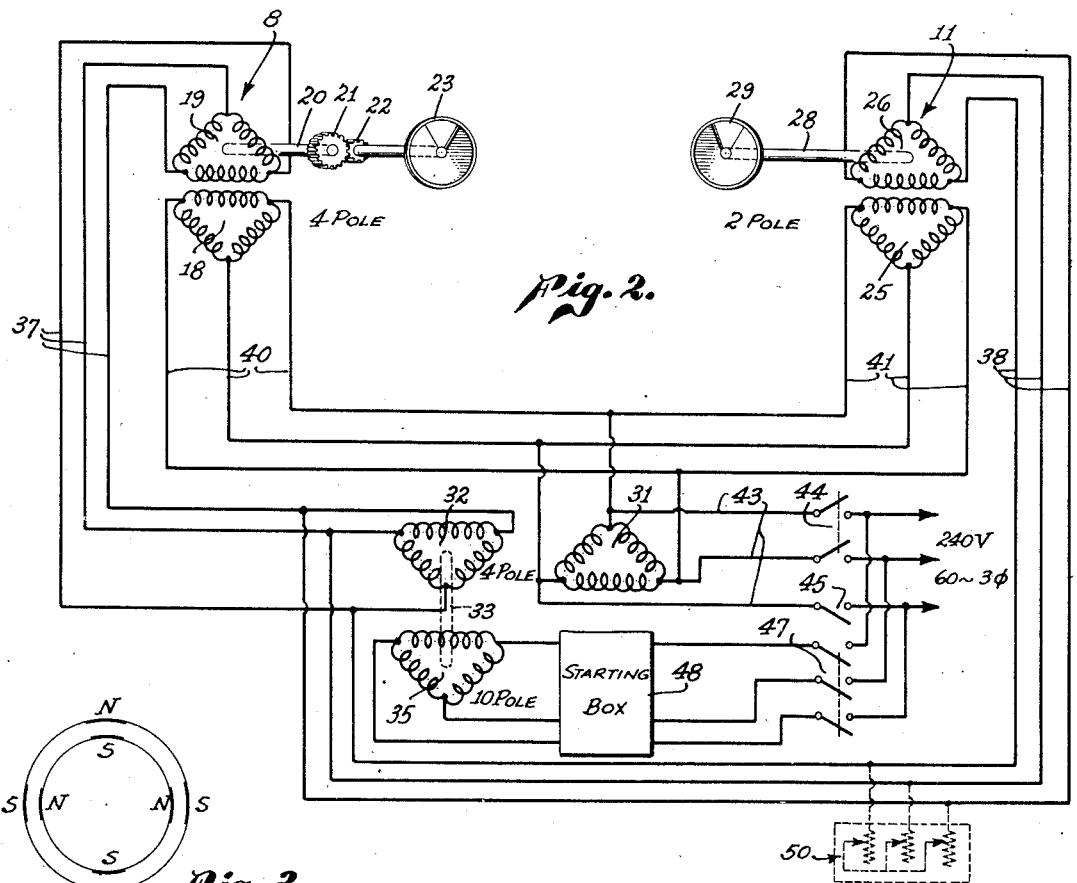
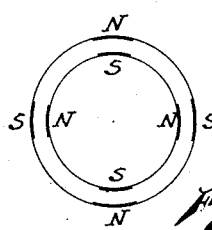
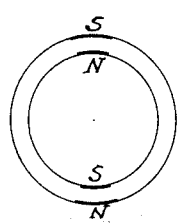
Inventor
WILLIAM F. ARNDT,
By
Orl R. Gosham
Attorney Patented Feb. 9, 1943

2,310,339

UNITED STATES PATENT OFFICE 2,310,339

DRIVE SYSTEM FOR PROCESS PHOTOGRAPHY

William F. Arndt, Los Angeles, Calif., assignor to Warner Brothers Pictures, Inc., a corporation of Delaware Application July 26, 1940, Serial No. 347,799

3 Claims. (Cl. 172—293)

This invention relates to the art of motion picture production and particularly to the production of composite motion pictures by the translucent screen method.

The general method of and means for making translucent screen composite motion pictures, as is well known in the art, comprises projecting on the back of a translucent screen a scene such as that of an ocean, of a forest, of a road, or any other picture which is to form the background portion of the final composite picture. The picture camera is positioned in front of the screen for photographing the projected background scene along with any foreground action occurring immediately in front of the screen, the final picture being formed by both the projected picture and the action. It is well known that although motion pictures appear continuous to the eye, they are projected on the screen intermittently. In order that the camera properly photograph the projected picture, it is necessary that the picture be present on the screen at the time the camera shutter is open to expose the picture negative, inasmuch as both the projector and camera usually utilize shutters in their normal manners of projection and photographing. Where the background projector has no shutter to increase the light on the screen, synchronization is still required since the camera film should not be exposed while the projected film is moving.

The projector and camera motors are operated in synchronism to advance the respective films at the standard speed of ninety feet a minute. The motors are usually of the "selsyn" or interlock type whereby a definite frequency is impressed upon the stators of the motors and on the stator of a distributor or transmitter, and another frequency produced by the distributor motor is impressed upon the motor rotors, the motors thereby keeping in step during operation. However, the usual synchronous operation of the two motors is not sufficient to provide the proper registry of the projector and camera shutters or the proper isochronal relationship between the two films. This relationship in the past has been established by first energizing the stators of the distributor and motors to lock them electrically in accordance with the frequency of the supply source and the number of poles on the motors and then physically adjusting the shutters. Although the distributor and motors will always interlock the same electrically, their physical position of interlock will generally be determined by the physical position of the rotor of the distributor which is usually larger than the rotors of the motors and will therefore predominate. In other words, the rotors of the motors will shift in position in accordance with the rest position of the distributor rotor.

After the motors have been interlocked, it is necessary for the projectionist and cameraman to notify each other of the particular position of his shutter with respect to the locked positions of the motor rotors and then, through means of a clutch, to adjust one or both of the shutters to an isochronous position. After this is accomplished, the distributor driving motor may then be energized and the shutters will open in the proper registry as the motors start and remain in step. These adjustments take time, and with the use of "blimps" over the camera, it is not a simple procedure. Methods of and means for making these adjustments are disclosed and claimed in U. S. Patents 1,980,806 of November 13, 1934, and 2,004,992 of June 18, 1935. After each "take" the motors are de-energized and it is again necessary to go through the steps of adjustment before the next "take" may be made.

Although it requires time and there is always the possibility of error in making the adjustments, perhaps the greatest difficulty arises from making the actors wait during the adjustment period. After a number of rehearsals, the actors become in the mood and many times they lose it and even become irritated during this waiting period. The motors now used for projectors and cameras are usually either two-pole or four-pole, which operate on a sixty-cycle, three-phase current from a four-pole distributor rotating at 1200 R. P. M. Thus the rotating speed for the four-pole motors is 1200 R. P. M., and for the two-pole motors it is 2400 R. P. M. Since the shutter speed of both projector and camera must be 1440 R. P. M., it is obvious that a gear ratio of six-to-five is used for the four-pole motors and a ratio of six-to-ten for the two-pole motors. Thus there are ten possible interlock positions for the shutter driven by a four-pole motor.

The present invention, therefore, is directed to a motor drive system whereby the system may be initially adjusted after it has been electrically interlocked and from then on the shutters in both the projector and camera will always operate in synchronism and isochronism. That is, the present system employs the usual two- and four-pole motors now in general use and also utilizes the same distributor and circuits. However, a different gear ratio is provided between the motor rotors and shutters and a change is made either in the driving motor for the distributor or in the frequency of the energy supply to the present driving motor. With this arrangement as explained hereinafter, the system may be once adjusted and will then remain in isochronism for any number of starts and stops of the apparatus.

The principal object of the invention, therefore, is to facilitate the synchronous and isochronous operation of an interlock motor system.

A further object of the invention is to provide an arrangement of distributor and driving motors for motion picture apparatus which will always operate in synchronism and isochronism.

Although the novel features which are believed to be characteristic of this invention will be pointed out with particularity in the appended claims, the manner of its organization and the mode of its operation will be better understood by referring to the following description read in conjunction with the accompanying drawing forming a part thereof, in which Figure 1 is a diagrammatic view of a system for producing composite pictures;

Figure 2 is a diagrammatic-schematic view embodying the invention;

Figure 3 is a diagrammatic view of a four-pole motor;

Figure 4 is a diagrammatic view of a two-pole motor; and

Figure 5 is a diagram of the interlock relationship between two- and four-pole motors in accordance with the invention.

Referring now to Fig. 1, a translucent screen of any well known type is shown at 5 with an actor 6 positioned in front thereof. On the rear of the screen is projected a background scene by a background projector 7 driven by a motor 8, while in front of the screen a picture camera 10, driven by a motor 11, photographs the scene composed of the projected background and the actor 6. For simplicity, the drive system is shown by single line connections wherein power is supplied to the stator of motor 11 over conductor 13 and to the motor 8 over conductor 14, and to the distributor over conductor 15, while the stators of the distributor and motors are inter-connected over conductors 16 and 17.

In Fig. 2, a detail drawing of the three-phase connections between the motors is illustrated wherein the background projector motor 8 is a four-pole motor with its stator 18 and its rotor 19. Connected to the rotor 19 by a shaft 20 is a driving gear 21 which drives a gear 22 driving a shutter 23. The ratio between the gears 21 and 22 is two-to-one. To the right of the drawing is similarly illustrated the picture camera motor 11 which is a two-pole motor having a stator winding 25 and a rotor winding 26. The rotor has a shaft 28 upon which is mounted a shutter 29. Although the shutter 29 is illustrated as mounted directly on the motor shaft, this is merely for purposes of explanation, it being understood that various connections may be made as long as the one-to-one relationship is maintained. This is also true for shutter 23.

The distributor for the motors 8 and 11 is shown having a stator winding 31 and rotor winding 32, the rotor being driven through a shaft 33 by a synchronous motor 35. The rotors 19, 26 and 32 are all interconnected over three-phase conductors such as 37 and 38. The stators 18, 25 and 31 are also interconnected over conductors 40 and 41. Power is supplied to the stators over conductors 43 through a three-pole switch, two poles of which are interconnected at 44 for simultaneous operation, while the remaining pole 45 is individually operated. The stators are connected to the usual 240-volt, 60-cycle, 3-phase power supply. The motor 35 is also supplied from the same power source over a three-pole switch 47, through a starting box 48, the latter being adapted to gradually increase the voltage and gradually bring the distributor rotor 32 up to speed.

With the above system, the stators 19, 26 and 32 always interlock in the same electrical position and will thus place the shutters in the same physical position. So when the shutters 23 and 29 are once adjusted with respect to a locked position such as shown in the drawing, this position will be maintained during all future operations of the system. Thus, no clutches or waiting periods are required. This is accomplished because of the gear ratios used with the different poled motors and the slip frequency and number of poles on the distributor and distributor driving motor.

Since the motor 35 is a ten-pole motor, the 60-cycle 3-phase source will rotate it at 720 R. P. M. which will be the speed of the four-pole distributor motor. This is also the speed of the four-pole projector motor 8 which, through the two-to-one gears 21 and 22, will drive the shutter 23 at 1440 R. P. M., the required speed. The two-pole motor 11, however, will rotate at 1440 R. P. M., and since it is directly connected to shutter 29, this shutter will also rotate at the proper speed. The two shutters will, therefore, run in synchronism at the correct speed.

To illustrate that the physical and electrical interlock positions for the shutters will be always the same with the above arrangement, reference is made to Figs. 3, 4 and 5. In Fig. 3, the instantaneous condition of a four-pole motor is illustrated wherein the stator is shown by the outside circle with alternate north and south poles. The rotor is shown by the inner circle also with alternate north and south poles. The figure illustrates one interlock position. This figure also illustrates that there are only two locking positions possible—that is, when the upper south pole of the rotor is in the position shown or is 180° displaced therefrom as shown by the lower south pole. Thus, when one phase of the motor is energized, the rotor will shift to one or the other of these positions.

In Fig. 4, a similar diagram illustrates that a two-pole motor has only one locking position since it is necessary that the upper north pole be always opposite the upper south pole.

In Fig. 5 are shown diagrammatically the shutter positions when the motors 8 and 11 are locked in all possible positions. For instance, the small circles 2 having their arrows pointing upwardly may represent a shutter position, such as shown in Fig. 2. The large circles represent the rotor of the four-pole motor 8. The left-hand diagram shows the rotor and shutter positions in one locking position for motor 8, it being realized, of course, that since motor 11 has only one locking position, circle 2 also represents the position of shutter 29, which is always the same electrically. The right-hand diagram shows the rotor and shutter positions for the other interlock position of the rotor 19, and it will be observed that the shutter assumes the same position as in the first interlock position. Thus, the two shutters will always be properly phased regardless of their rest positions at the start of operation. Although a ten-pole driving motor is shown used to drive the four-pole distributor from a 60-cycle, 3-phase source, the same speed of 720 R. P. M. may be obtained by using a six-pole driving motor if the frequency of the power supply is 36 cycles. Other combinations may likewise be employed, such as a speed-controlled direct-current motor in place of motor 35.

In operating the above system, the switch 44 is first closed, which energizes one phase of each of the stators 18, 25 and 31. The stators will thus lock their respective rotors and maintain them in a fixed electrical position with respect to one another. After this relationship has been made, switch 45 is then closed, which will increase the lock on the system. The use of only one phase to lock the motors is explained by the fact that should an unbalance exist in the various phases, a three-phase interlock would cause rotation. However, immediately after the closing of switch 45, switch 47 is closed to energize motor 35, which, as it gradually increases in speed through starting box 48, will bring up the motors 8 and 11 simultaneously in their interlock position with the rotor 32 of the distributor. After a "take," it is customary to open all switches and allow the motors and distributor to coast to a stop, although a brake may be provided for the distributor and its driving motor combination. The switch 47 may be eliminated, the starting box 48 being connected directly to conductors 43.

To permit operation of the motors 8 and 11 at other speeds besides their respective interlock or selsyn speeds, it is only necessary to close switches 44 and 45 and then, by the use of a variable resistance unit 50, to operate the motors as induction motors changing their speed by varying the amount of resistance in shunt to the rotor windings while maintaining them in lock.

The above disclosed system, therefore, provides a method and arrangement for driving any type of motion picture apparatus and particularly camera and projector shutters which must be operated both in synchronism and isochronism, without the necessity of intermediate clutches between the rotor shafts and shutter shafts which require adjusting before each "take." All errors and waiting time are therefore eliminated. It is to be understood that although a combination of two- and four-pole motors has been described above, the use of two-pole or four-pole motors for both camera and projector will provide equally satisfactory results.

Although the shutter positions of the camera and projector have been emphasized in the above description, it is to be remembered that the respective pull-down mechanisms for the films of the apparatus are geared to the motors as well as the shutters and that the above description is therefore applicable to these elements also.

What I claim as my invention is:

1. An interlock motor system comprising an interlock four-pole motor, a rotatable element driven by said motor, a two-pole interlock motor, a second rotatable element driven by said two-pole motor at the same speed as said first element, a four-pole distributor for said motors, the rotor of said distributor being connected to the rotors of said motors, said distributor and said interlock motors having the same winding ratio between their respective stators and rotors, and a ten-pole motor for driving said distributor, the stators of all of said motors being supplied from a sixty-cycle, three-phase source of energy.

2. An interlock motor system comprising an interlock four-pole motor, a rotatable element driven by said motor, a two-pole interlock motor, a second rotatable element driven by said two-pole motor at the same speed as said first element, a four-pole distributor for said motors, the rotor of said distributor being connected to the rotors of said motors, said distributor and said interlock motors having the same winding ratio between their respective stators and rotors, and a six-pole motor for driving said distributor, the stators of all of said motors being supplied from a thirty-six-cycle, three-phase source of energy.

3. An interlock motor system comprising an interlock four-pole motor, a rotatable element driven by said motor, a two-pole interlock motor, a second rotatable element driven by said two-pole motor at the same speed as said first element, a four-pole distributor for said motors, the rotor of said distributor being connected to the rotors of said motors, said distributor and said interlock motors having the same winding ratio between their respective stators and rotors, and a motor for driving said distributor, the stators of all of said motors being supplied from a three-phase alternating current source of energy, the ratio between the frequency of said source of energy and the number of poles of said distributor driving motor being six-to-one.

WILLIAM F. ARNDT.